US007023474B2

United States Patent
Armstrong

(10) Patent No.: US 7,023,474 B2
(45) Date of Patent: *Apr. 4, 2006

(54) METHOD AND SYSTEM FOR ENABLING THE SINGLE USE OF DIGITAL CAMERAS

(75) Inventor: William Craig Armstrong, Wellesley, MA (US)

(73) Assignee: Polaroid Corporation, Waltham, MA (US)

( * ) Notice: Subject to any disclaimer, the term of this patent is extended or adjusted under 35 U.S.C. 154(b) by 699 days.

This patent is subject to a terminal disclaimer.

(21) Appl. No.: 09/861,806

(22) Filed: May 21, 2001

(65) Prior Publication Data

US 2004/0201678 A1    Oct. 14, 2004

(51) Int. Cl.
*H04N 5/225* (2006.01)
*H04N 9/04* (2006.01)
*H04N 7/00* (2006.01)
*H04N 11/00* (2006.01)

(52) U.S. Cl. .............. 348/207.1; 348/552; 348/231.99
(58) Field of Classification Search ........... 348/207.99, 348/207.1, 207.11, 211.3, 552, 231.99; 396/6
See application file for complete search history.

(56) References Cited

U.S. PATENT DOCUMENTS

| 4,405,829 | A | 9/1983 | Rivest et al. ............... 178/22.1 |
|---|---|---|---|
| 4,890,130 | A | 12/1989 | Takei et al. .................. 354/288 |
| 4,896,178 | A | 1/1990 | Ohmura et al. .......... 354/145.1 |
| 5,126,775 | A | 6/1992 | Nakai et al. ................. 354/288 |
| 5,235,364 | A | 8/1993 | Ohmura et al. .......... 354/145.1 |
| 5,235,366 | A | 8/1993 | Kucmerowski ............. 354/212 |
| 5,304,987 | A | 4/1994 | Brunson et al. ............ 340/654 |
| 5,619,257 | A | 4/1997 | Reele et al. ................... 348/64 |
| 5,694,484 | A | 12/1997 | Cottrell et al. .............. 382/167 |
| 5,878,283 | A | 3/1999 | House et al. ................... 396/6 |
| 5,974,401 | A | 10/1999 | Enomoto et al. ............. 705/40 |
| 6,128,415 | A | 10/2000 | Hultgren, III et al. ...... 382/276 |
| 6,876,394 | B1* | 4/2005 | Silverbrook ............. 348/207.1 |
| 2001/0022617 | A1* | 9/2001 | Takaba et al. .............. 348/207 |
| 2001/0030773 | A1* | 10/2001 | Matsuura et al. ........... 358/471 |
| 2001/0040625 | A1* | 11/2001 | Okada et al. ................ 348/207 |

FOREIGN PATENT DOCUMENTS

| EP | 0 860 982 A2 | 8/1998 |
|---|---|---|
| EP | 1 075 138 A2 | 2/2001 |
| JP | 11275421 A * | 10/1999 |
| JP | 2000196931 A * | 7/2000 |
| JP | 2000228740 A * | 8/2000 |
| WO | WO 00/22903 | 4/2000 |

(Continued)

OTHER PUBLICATIONS

"Applied Cryptography", 1996, pp. ix, xii, xiii, 461-482, New York, NY, John Wiley and Sons.

(Continued)

*Primary Examiner*—Aung Moe

(57) ABSTRACT

To enable the use of a single use digital camera for acquiring, selecting and storing images, thereby providing the ability to delete unwanted images, a method is disclosed in which a customer is provided a single use digital camera, which the customer uses for acquiring, selecting and storing digital images, return of the digital camera is accepted from the customer after the storing of the images and the selected images are retrieved for the customer. The single use digital camera does not provide the customer the ability to retrieve the stored images. A system that provides the ability to perform the steps of the method for use of a single use digital camera is also described.

25 Claims, 7 Drawing Sheets

FOREIGN PATENT DOCUMENTS

| WO | WO 00/31966 | 6/2000 |
| WO | WO 00/48384 | 8/2000 |
| WO | WO 00/69164 | 11/2000 |
| WO | WO 01/15440 A1 | 3/2001 |

OTHER PUBLICATIONS

"Security ICs Are Targeting Consumer Applications", Nov. 6, 2000, pp. 105-102, Electronic Design.

* cited by examiner

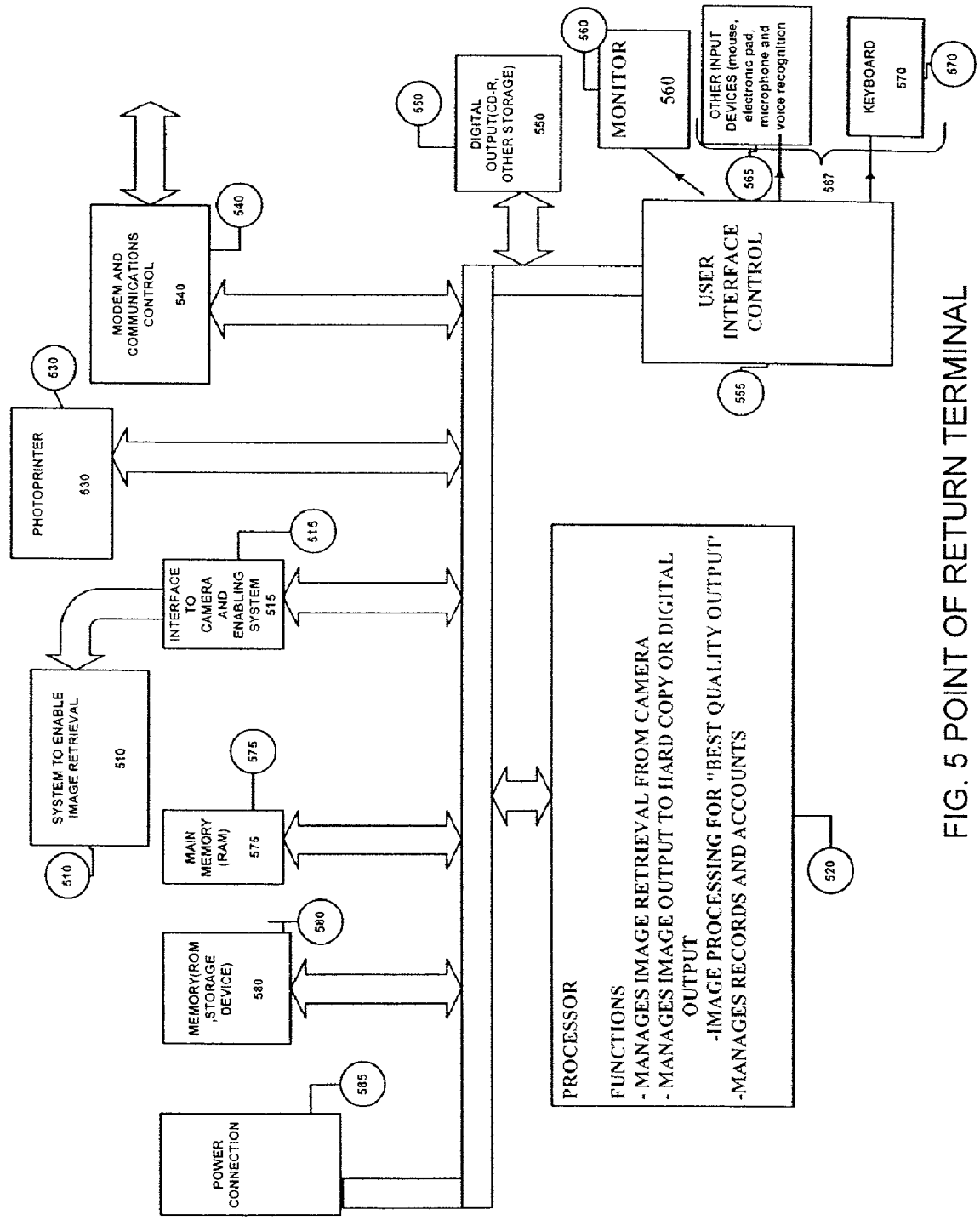
FIG. 5 POINT OF RETURN TERMINAL

METHOD AND SYSTEM FOR ENABLING THE SINGLE USE OF DIGITAL CAMERAS

CROSS-REFERENCE TO RELATED APPLICATION

This application is related to commonly owned patent application Ser. No. 09/861,807 entitled "Method and System for Enabling the Use of Single Use Reloadable Digital Camera", now U.S. Publication No. 2004-0201679.

BACKGROUND OF THE INVENTION

1. Field of the Invention

The present invention relates to the use of digital cameras as "single use" cameras. More specifically, it relates to a method for enabling the use of digital cameras as "single use" cameras while providing functionality absent in conventional "single use" cameras.

2. Background Description

Single use cameras constitute one of the fastest-growing segments in photography. Every year over 100 million single use cameras are sold in the United States and the market has been growing at over 10 percent per year over the past five years. Single use cameras are used while traveling, during holidays, at amusement parks and at family events such as weddings. They are purchased for convenience and for special events. Representative examples of single use cameras are provided in U.S. Pat. Nos. 4,890,130; 4,896,178; 5,126,775; 5,235,366; and 5,235,364.

The sales of single use cameras have grown almost exponentially since 1989. The customer experience from single use cameras parallels that of other conventional photographic cameras. A large number of the photos taken with single use cameras are either not acceptable or not of interest to the user. Therefore, the user pays for the development of photos that are not wanted or misses a significant portion of their photographic opportunities. Single use cameras currently available do not provide the user the opportunity to select those photos that the user wants to retain.

Another recent development in their photographic market is the growth of Internet sites that provide the user with the ability to share their photos with other users and to order prints or reprints of the user's photos. The present model for sharing photos from a conventional photographic camera consists either of scanning the photos, which have been developed conventionally, and loading them onto a web site, or of providing the single use camera or the roll of film to a service provider that develops the photos, scans them and loads them onto the web site. Once the photos have been loaded onto the web site, the user can then select those photos that the user wants to share. While this mode of operation presents an opportunity to the customer, it precludes the possibility of sharing the photos in a timely fashion. Thus, customers are not provided the opportunity to share their photos at the moment of development.

SUMMARY OF THE INVENTION

It is the primary object of this invention to provide a system and method for enabling the use of a single use digital camera for acquiring, selecting and storing images thereby providing the ability to delete unwanted images.

It is another object of this invention to provide a system and method for enabling the use of a single use digital camera in sharing the images at the time they are retrieved.

To achieve these and other objects, one aspect of the invention includes a method of enabling the use of a single use digital camera for acquiring and storing images and thereafter providing a customer means for retrieving selected images from the stored images upon the customer returning the digital camera to a selected location, comprising the steps of: providing the customer a single use digital camera of the type that electronically records and stores images selected by the customer, and provides no means for the customer to retrieve the stored images from the digital camera, and, accepting return of the digital camera from the customer after the customer has utilized the digital camera to acquire and store images and, thereafter, retrieving selected images for the customer. In another aspect of the invention, the method further comprises the steps of transmitting the retrieved images to a remote node of a network, and, sharing the retrieved images via the network with at least one of a plurality of other entities located at other remote nodes of the network. In still another aspect of the invention, the method further comprises the step of preparing the camera for reuse and providing the camera, after it has been prepared for reuse, to another customer or to the same customer.

Another aspect of this invention is a system providing means to perform the steps of each of the described methods.

The method and systems of this invention provide a single use digital camera that can be used while traveling, during holidays, at amusement parks, at family events such as weddings, at other special events, when a customer needs a camera and does not have one, or when a conventional camera, due to the large number of moving parts in a conventional camera, would not be used. The single use digital camera of this invention would ensure that the customer could select and keep their best images. The method and systems of this invention enable the use of a single use digital camera that allows the customer to transfer the images to a web site from which they can be shared with other recipients or from which the images can be printed. The sharing of the images would happen when the images are retrieved.

BRIEF DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 5 depicts a block diagram of selected components of an embodiment of the point of return terminal.

DETAILED DESCRIPTION

To enable the use of a single use digital camera for acquiring, selecting and storing images, thereby providing the ability to delete unwanted images, a method is disclosed in which a customer is provided a single use digital camera, which the customer uses for acquiring, selecting and storing digital images, return of the digital camera is accepted from the customer after the storing of the images and the selected images are retrieved for the customer. The single use digital camera provides no means for the customer to retrieve the stored images. A system that provides means to perform the steps of the method for use of a single use digital camera is also described.

The System and Method

Figure 1:
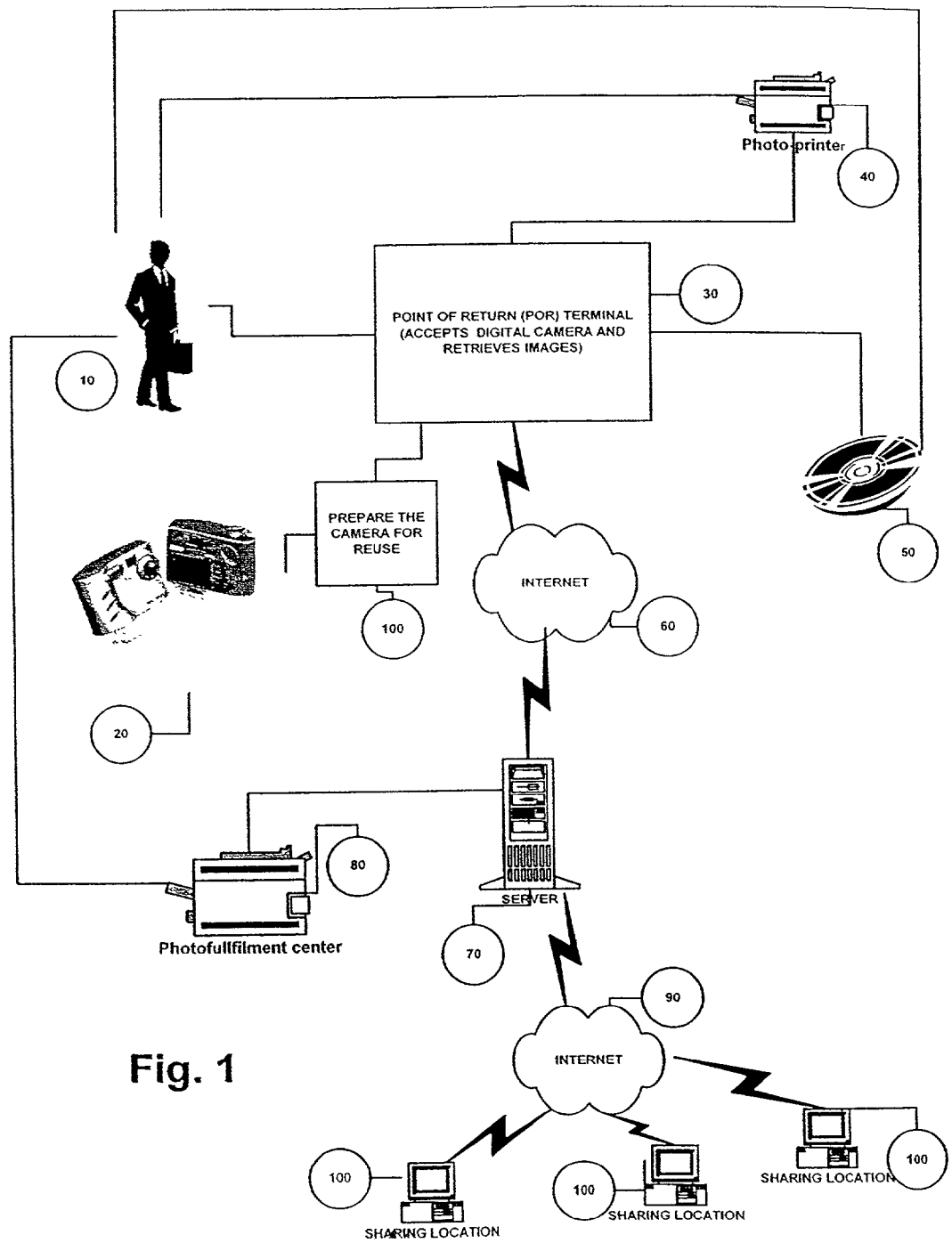
FIG. 1 depicts a graphical representation of an embodiment of the system that enables the use of a single use digital camera.

Referring to FIG. 1, a customer 10, is provided with a single use digital camera 20. Subsequently, the customer uses the camera for acquiring, selecting, and storing images. The single use digital camera 20 provides no means for the customer to retrieve the images. Upon receipt of the single use digital camera, the customer renders a payment for the use of the digital camera. Such payment can include a refundable portion. The refundable portion can be used to defray the cost of using the digital camera again after it has been retrofitted for reuse or it can be used to provide an incentive for the customer to return the camera and retrieve the images. The customer returns the single use digital camera to a point of return terminal 30. The selected and stored digital images are retrieved at the point of return terminal 30. Innovative means are needed to retrieve the digital images from the camera. Such innovative means will be detailed below when the point of return terminal 30 is described. The information as a retrieved from the camera is in the form of digital data files and has to be rendered in a form that is useful to the customer. The retrieved images can be rendered in hardcopy by means of a photo printer 40. The photo printer 40 can be located at the same location as the point of return terminal. Alternatively, the photo printer could be a photo fulfillment center 80 located at a remote point. While the embodiment in which the point of return terminal is located at one physical place would be most convenient for the customer, it should be apparent that other embodiments are possible. Such embodiments would be dictated by convenience and economics. It should be apparent to that it is possible to configure a point of return terminal 30 in which the return of the camera occurs at one location, the camera is transported to another location at which the images are retrieved. The retrieved images could then we converted to hardcopy at the same location where the images are retrieved or at still another location.

The retrieved images can be also rendered in electronic form. Such an electronic form could be placed in a removable storage medium 50 such as a recordable CD (CD-R or CD-RW), a ZIP™ disk, or one or several floppy disks. Alternatively, their retrieved images could be transmitted via the Internet 60 to a remote node 70 from which the images could be placed in a sharing site and shared with recipients at other computers 100. This mode of operation would decrease the time from acquisition to sharing. At the "point of return terminal", the customer could specify the list of sharing recipients and provide a list or link to a list of Internet addresses. If desired, the images could be transmitted from the remote node to a photo fulfillment center 80. At their photo fulfillment center the images would be rendered in hardcopy. From the photo fulfillment center 80, the images would then be delivered to the customer 10.

Upon retrieving the images, the camera can be prepared for reuse. Such a preparation for reuse can occur at the point of return terminal 30 or it can occur at a separate location. The images will be removed from memory and deleted. The memory module in the digital camera may comprise one or more semiconductor memory devices, or may comprise an external memory module. The external memory module can comprise a magnetic disk drive, a flash memory, or any of various other types of memory modules known in the relevant art. (Examples of external memory modules range from floppy disks, optical disks, advanced floppies such as Click™ disks to non volatile solid state memories such as SmartMedia™ cards, MemoryStick™ cards, CompactFlash™ cards). If the memory module is internal to the camera and cannot be removed, the images will be deleted and the memory will be ready for re-use. If the memory module is external, several options exist. The module could be removed and replaced or the same module could be used after deleting the images. The camera batteries would be replaced or recharged. At that point the camera would be ready to be used by another customer or by the same customer. If the camera was prepared for reuse at a separate location, it could be transferred to another location for resale. Otherwise, if the preparation for reuse occurred at the location of the point of return terminal, the retrofitted digital camera could be placed for resale to another customer, or for reuse by the same customer, at that location.

Figure 2A:
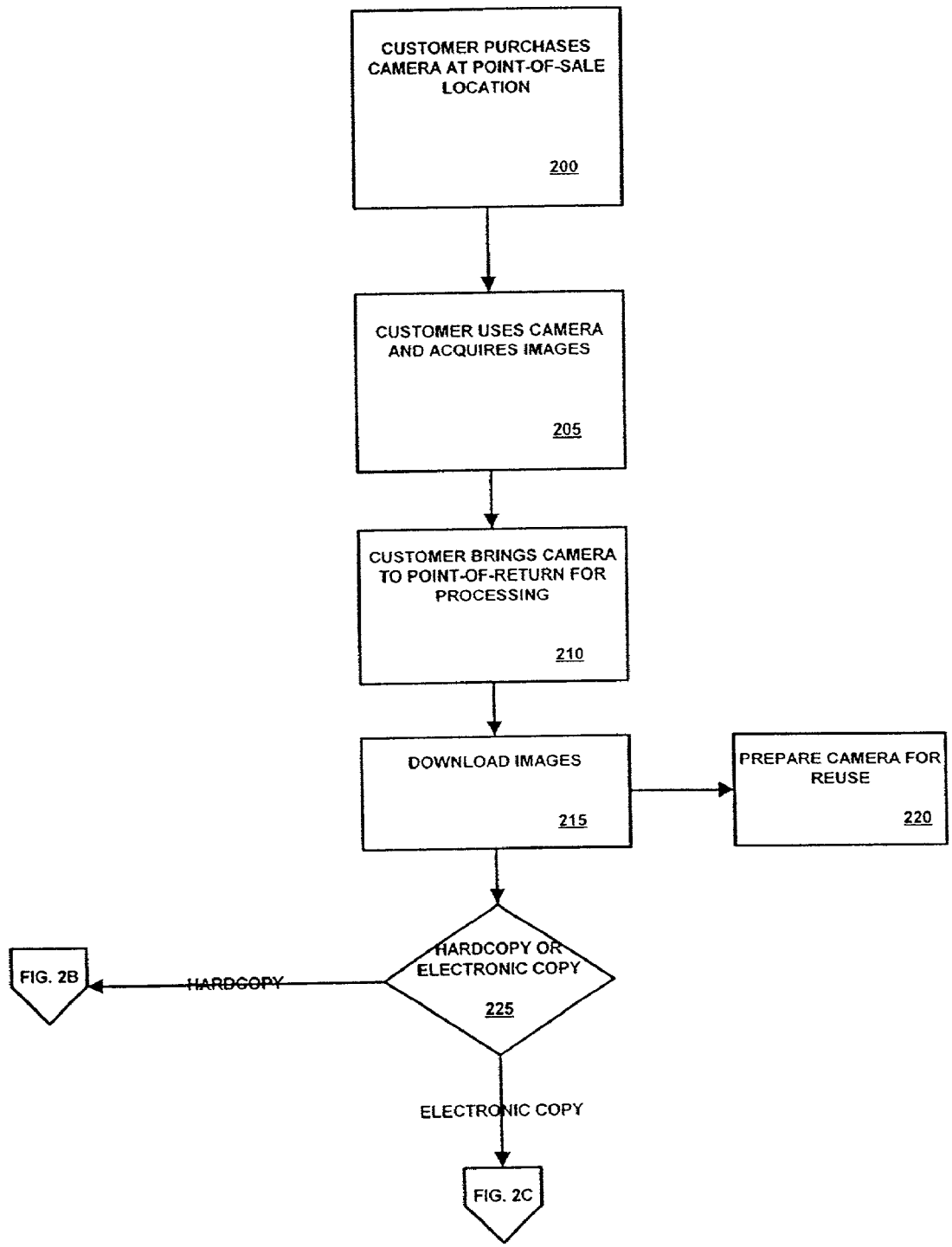
FIGS. 2A, 2B, and 2C depict a flowchart of an embodiment of the method that enables the use of a single use digital camera.
Figure 2B:
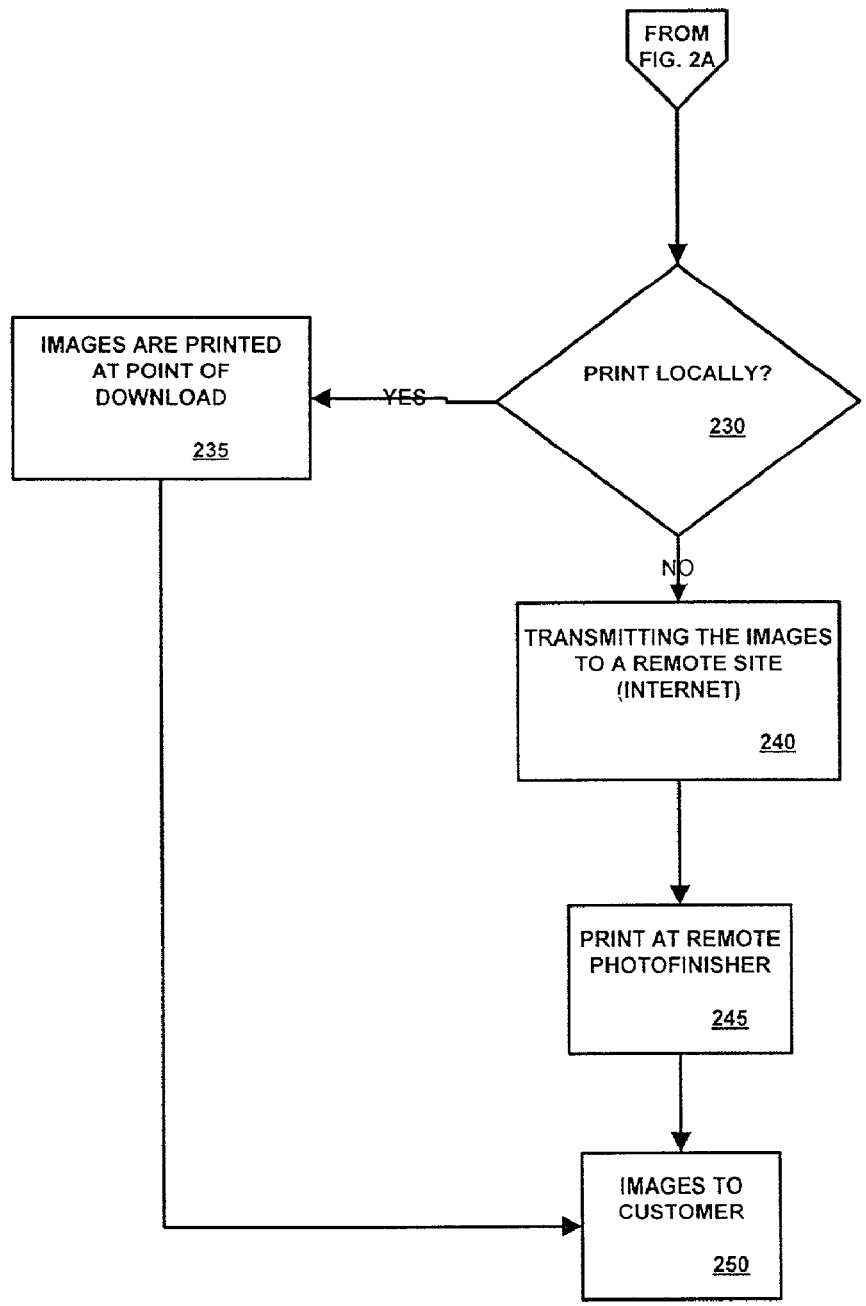
Figure 2C:
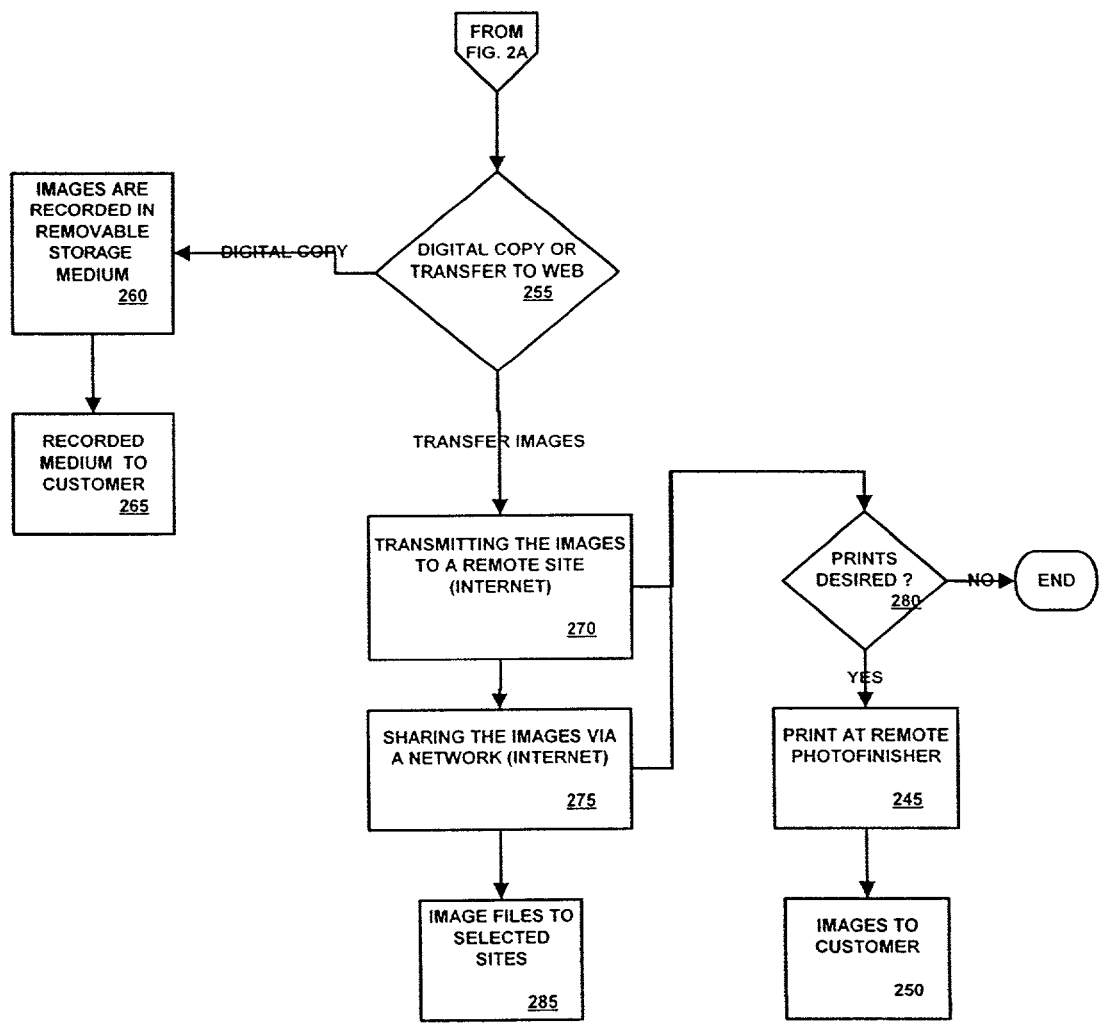

FIGS. 2A, 2B, and 2C provide a flowchart of one embodiment of the method to enable the use of a single use digital camera. Referring to FIG. 2A, the customer purchases the single use digital camera 20 at a point of sale location (step 200). In one embodiment, the single use digital camera 20 includes means for the customer to view the images that the customer acquires, means for storing the images and means for selecting a predetermined number of the stored images for continued storage while removing the remainder of the stored images from storage within the single use digital camera 20. In that embodiment, selected images can not be removed from storage by the customer after being selected for continued storage. The single use digital camera of this invention 20 provides no means for the customer to retrieve the images. The customer then uses the single use digital camera 20 to acquire and store images (step 205). Subsequently, the customer returns the single use digital camera to a point of return terminal 30 for image retrieval (processing) (step 210). Selected images from the stored images are then retrieved (downloaded) from the camera (step 215). The stored images are then removed from the digital camera and the camera is prepared for re-use (step 220). The selected images are retrieved for the customer in hardcopy form or electronic form (step 225). Referring to FIG. 2B, when the selected images are retrieved in hardcopy form, the retrieving of the images in hardcopy form can occur at the selected location at which the camera was returned or at a remote site (step 230). If the retrieving of the images in hardcopy form occurs at the location at which the camera was returned, the selected images are printed at that location (step 235). The printed images are then returned to the customer (step 250). If the retrieving of the images in hardcopy form occurs at a remote site, the selected images are transmitted to a remote site, for example, a node of a network, (step 240) and are printed at a remote photofinisher (step 245). The printed images are then returned to the customer (step 250). Referring to FIG. 2C, when the selected images are retrieved in electronic form, the selected images can be retrieved for the customer in digital copy (step 260), for example, a removable storage medium 50 such as a recordable CD (CD-R or CD-RW), a ZIP™ disk, or one or several floppy disks, or can be transmitted to a remote node of a network (step 270), for example transmitted via the Internet 60 to a remote node 70. If the selected images are retrieved for the customer in digital copy, the digital copy, for example the storage medium, is then provided to the customer (step 265). If the selected images are transmitted to a remote node of a network, the retrieved images are then shared via the network (step 275) with at least one of a plurality of other entities 100 located at other remote nodes of the network. The retrieved images are then transmitted to the sites of the at least one of a plurality of other entities 100 (step 285). If hardcopy of the shared retrieved images is desired (step 280), then the shared retrieved images are printed at a remote photofinisher (step 245). The printed shared retrieved images are then returned to the customer (step 250). While the flowchart of FIGS. 2A, 2B, and 2C indicate different paths for the different options that a customer has rendering the retrieved images, it should be apparent that the customer can select all means of obtaining the image data (hardcopy, digital copy, transfer to a remote network site and share) concurrently.

The Single Use Digital Camera

Figure 3A:
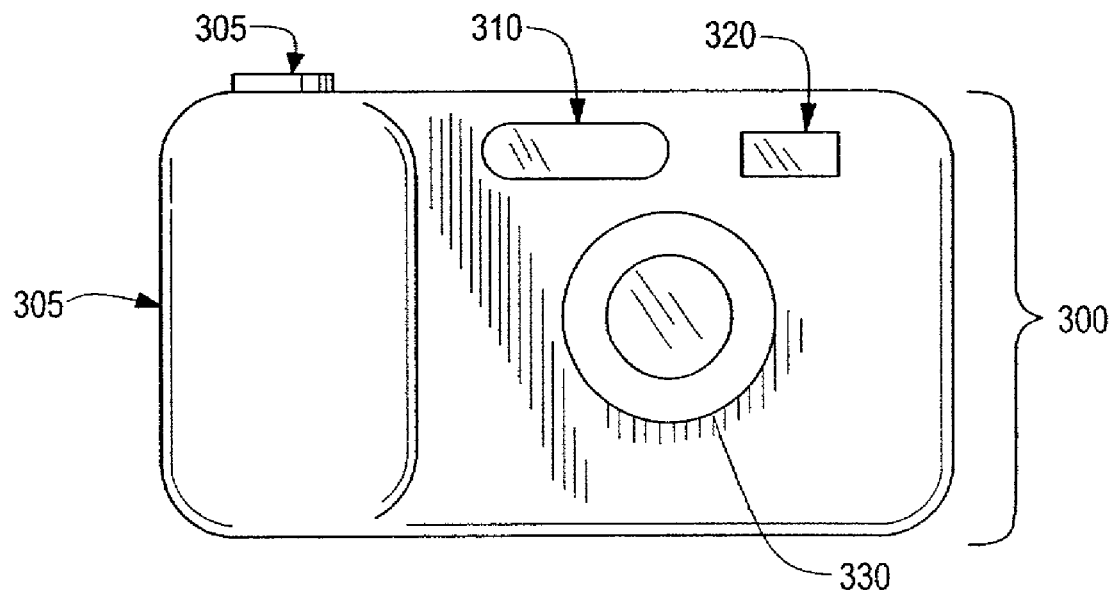
FIGS. 3A and 3B are graphical representations of the front and back view of a typical handheld digital camera.
Figure 3B:
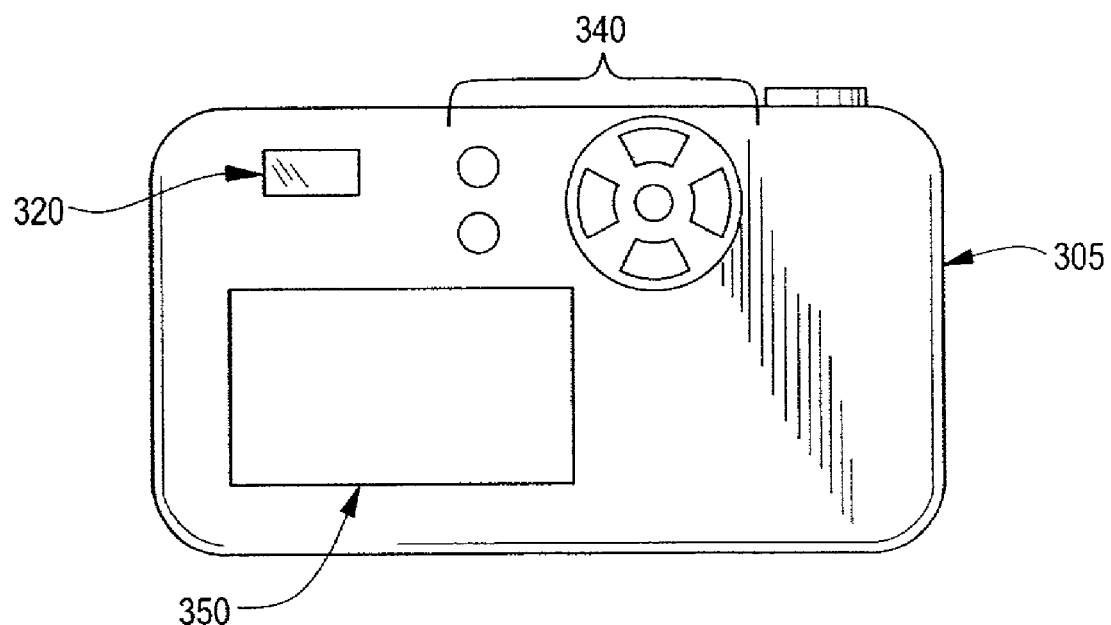

FIGS. 3A and 3B depict the front and back views of a single use handheld digital camera 300 according to this invention. The camera comprises a camera body 305 which houses the camera components. A viewfinder 320 is optical coupled to the lens 330. A flash assembly 310 is also located on the body 305. A shutter release button 315 serves to actuate the shutter and initiate the capture of the image. A display device 350 is mounted on the body. In one embodiment the display device 350 is comprised of an LCD and provides the capability of viewing the image immediately after image acquisition. A number of selection buttons 340 are placed in the vicinity of the display. The selection buttons 340 are used to display menus on the display device and provide the capability to select from those menus and select options in camera operation. The camera user can then display the image that has been acquired and using the selection buttons can select or delete images and permanently store the selected images.

Figure 4:
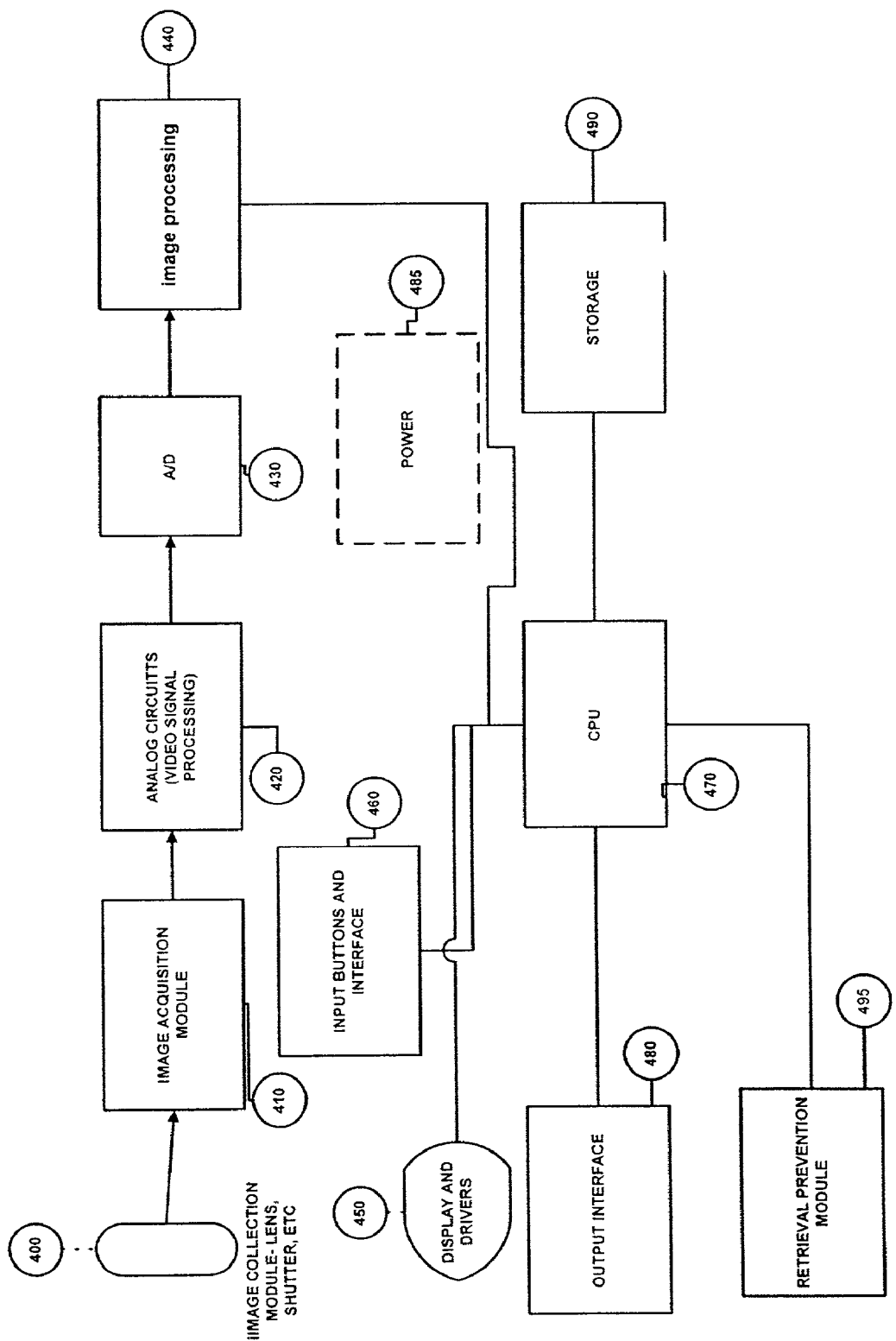
FIG. 4 depicts a block diagram of selected components of an embodiment of the single use digital camera.

FIG. 4 is a block diagram of selected components of one embodiment of the single use digital camera. The image collection module 400 comprises optical components and a shutter (not shown) that collect the image radiation and focus it on an image acquisition device (also not shown) which is part of an image acquisition module 410. The image acquisition module also comprises device drivers and acquisition electronics which are well known in the art and also not shown. In one embodiment, the image acquisition device would be a CCD imager. In another embodiment: the image acquisition device would be a CMOS imager. At the output of the image acquisition module 410, the image is comprised of analog electronic signals. Those analog electronic signals are processed by analog (video signal processing) circuits 420 and then converted to digital signals by A/D circuits 430. Further image processing, required to generate missing color samples and available to provide some image enhancement, is provided by image processor 440. It should be apparent that image processor 440 could be, in one embodiment, combined with central processing unit 470. The image can then be displayed using the display 450. The image can also deleted or selected using the input buttons 460. The selected images can be permanently stored in the storage module 490. The storage module 490 may comprise one or more semiconductor memory devices, or may comprise an external memory module (not shown). The external memory module can comprise a magnetic disk drive, a flash memory, or any of various other types of memory modules known in the relevant art.

A central processing unit 470 provides central control for the above described functions and can also perform functions such as image compression, image enhancement and encoding. It should be apparent that in some embodiments the central processing unit 470 could be comprised of several processors in order to provide faster processing of data, separate control from processing, or optimize the design. An innovative retrieval prevention module 495 provides inputs to the central processing unit to ensure that the customer has no means of retrieving the images.

The details of the embodiment of the retrieval prevention module 495 depend on the means used to prevent retrieval of the images. In a mechanical embodiment, no physical access to the output interface is provided to the customer. A mechanical tool of unique design is required in order to provide access to the output interface 480 by opening a location in the camera body. In contrast to conventional single use cameras, in which access to the film in an unprotected environment will prevent successful development, mechanical means alone might not be sufficient to deter the customer from accessing the digital images. Therefore, innovative combined mechanical and electrical means could be superior to purely mechanical means as a deterrent to retrieval of the images. Such combined means could comprise the previously described mechanical embodiment and electrical means such as an output interface 480 connector of unique proprietary design or a aground connection disabled when the camera body 305 is opened in a manner well known in the art. In the latter case, the open ground connection would generate a signal that would prevent retrieval of the images. Reconnection of the ground circuit would be implemented at a point of return terminal, such as shown in FIG. 5, at the select location at which the customer returns the camera. (The circuit used to provide the signal to the central processing unit would connect to both the ground and the power source 485. Such a circuit could be similar to that described in U.S. Pat. No. 5,304,987.)

In another embodiment, electronic means may be used to encode (encrypt) the image data is at the single use digital camera. The encrypted data is decoded (decrypted) at the point of return terminal. In the preferred mode of operations, the image data is first compressed in the CPU 470 and then encoded. It should be apparent to those skilled in the art that more than one processor could be used in the encoding and compression. The encoding (encrypting) algorithm is preferably applied before final storage. Since encryption randomizes the data and hides patterns, effective compression should take place before encryption. In one possible embodiment, the image data is compressed and selected for permanent storage before encryption. Once encrypted the data can not be read as an image before it is decrypted. This procedure effectively prevents the retrieval of the images by the customer.

One choice of the encryption system is the so-called public key/private key system. In this system one key (public key) is used for encrypting the data and a different key (private key) is used for decrypting the data. The word key is used symbolically here and is analogous to protecting the data with a "lock", wherein a key is used to obtain access to the data or to lock the data. In encryption, the key is the characteristic of the transformation between the original data and the encrypted data or of the transformation between the encrypted data and the original data. One widely used public key/private key algorithm is the RSA algorithm that was the first described in U.S. Pat. No. 4,405,829 issued on Sep. 20, 1983. (This and other encryption algorithms are also described in B. Schneier, "Applied Cryptography", $2^{nd}$ edition, 1996, ISBN 04-71117099.) The public key could be generated in software and the encryption algorithm could be performed in software. In that case, the entire system resides in the CPU 470 and its operating memory. Alternatively, the key generation and the encryption algorithm could reside in dedicated hardware. (See, for example, "Security ICs Are Targeting Consumer Applications", Electronic Design, Nov. 6, 2000, pp. 105–112, and p. 153.) The choice between software and the dedicated hardware is dictated by considerations of cost and processing speed.

In other possible embodiments, using electronic means, the image data is compressed using a unique compression algorithm where the details of the algorithm are not known to the camera user. In still another embodiment, using electronic means, the image data is stored using a unique format where the details of the format are not known to the known to the camera user.

The Point-of-Return Terminal

FIG. 5 depicts the block diagram of selected components of one embodiment of the point of return terminal. A system to enable image retrieval 510 provides the necessary components to allow retrieval of the images from the single use digital camera. An interface is provided between the system to enable image retrieval 510 and a processor 520. The functions of the processor 520 include managing the image retrieval from the single use digital camera, performing the necessary operations to obtain image data in original (as acquired) form and managing the process to output image data to hardcopy or digital output. A user interface control 555 links a monitor 560 and input devices 567, comprised of a keyboard 570 and other input devices (a mouse or an electronic pad or a microphone) 565, to the processor 520. The input devices 567 are used to input customer information, customer output preferences (such as hardcopy, digital copy, image sharing, or remote of printing), customer output data such as number of prints per image or in case of image sharing, the list of sharing recipients and a list or link to a list of Internet addresses.

Upon selecting hardcopy output, the image data can be processed to insure best quality output. Since the single use digital camera 305 is of a known type, its characteristics are known and a device profile can be constructed in the manner described in U.S. Pat. No. 6,128,415 (Hultgren et al., Device Profiles for Use in a Digital Image Processing System, issued on Oct. 3, 2000), which is hereby incorporated by reference herein. Then, the method described in U.S. Pat. No. 5,694,484 (Cottrell et al., System and Method for Automatically Processing Image Data to Provide Images of Optimal Perceptual Quality, issued on Dec. 2, 1997), also hereby incorporated by reference herein, can be used to provide an image of optimal perceptual quality rendered by a hardcopy device of known characteristics. If hardcopy output is selected by the customer, and locally available hardcopy is desired, the images are transferred to the local photo printer 530 through the printer interface. (It should be apparent that the printer physical interface would be one of several interfaces commonly used for output devices, such as a serial interface, RS-232, for example, or a parallel interface.) The local photo printer 530 is preferably a photo quality printer such as a dye sublimation printer, or a photo quality ink jet printer, or a digital mini-lab.

If remote hardcopy output is desired, or if image sharing is desired, the images have to be transmitted to a remote node of a network (such as the Internet). Transmission of the images is accomplished by a modem and communications control module 540 under the control of the processor 520. The modem 540 represents just one example of a data communication interface that can be used to convey information to a network such as the Internet. It should be apparent that other systems could be used to achieve the same result. Wireless links could also be implemented as a modem. In any such implementation, communication interface 540 sends and receives electrical, electromagnetic or optical signals that carry digital data streams representing various types of information.

For example, if image sharing is desired, under control of the processing unit, the images are uploaded, through the data communication interface 540 to a designated server or Web site. In this embodiment, a function in the processing unit identifies a Web site address, such as a Uniform Resource Locator (URL), and creates a Web document (for example, a file in the hypertext markup language, HTML, format). The image files are linked into the HTML file. A connection is established to the Web site or Web server that is identified in the addresses, through the network. The HTML file is, then, transferred to the Web server. If digital copy output is selected by the customer, the images are transferred to a digital copy output device 550 through a standard interface. (Interfaces between processing units and removable storage modules are well known in the art.) The digital copy output device 550 would preferably be a digital media output device such as a CD-R or CD-RW drive, a ZIP™ drive, a floppy disk drive, or any other removable digital media drive.

The embodiment of the system to enable image retrieval depends on the innovative means used in the single use digital camera 305 to prevent retrieval of the images. If mechanical means alone are used to prevent retrieval of the images from the digital camera by the customer, the system to enable image retrieval will comprise mechanical tools and fixtures. When the retrieval of the images is prevented by means of a camera body without physical access to the storage area, mechanical tools of special design will be required to enable image retrieval. Replacement parts for the camera body or portions of it could be required in this embodiment. In this embodiment, means for electrically connecting to the storage area in the camera will also be necessary components of the system that enables image retrieval 510 at the point of return terminal.

If combined electrical and mechanical means are used to prevent retrieval of a the images from the digital camera 305, the system to enable image retrieval 510 will comprise mechanical tools and fixtures and electrical components. When the retrieval of the images is prevented by means of a camera body without physical access to the storage area and by means of a circuit that detects the interruption of a ground connection when the camera body is opened to provide access to the storage area, a fixture that will complete the ground circuit will also be a necessary component of the system that enables image retrieval 510 at the point of return terminal.

When the retrieval of images is prevented by means of a camera body without physical access to the storage area and by means of an electrical connector of special design for connecting to the storage area in the camera, a mating connector of the same special design will also be component of the system that enables image retrieval 510 at the point of return terminal.

When the retrieval of the images is prevented by encoding (encrypting) the image data at the single use digital camera, the system to enable image retrieval 510 will include an electrical connector to connect to the storage area 490 in the digital camera 305 and the interface 515 between the storage area 490 in the camera 305 and the processor 520 in the point of return terminal. The encoded data will then be decoded at the point of return terminal. If the encryption system is the so-called public key/private key system, one key is used at the camera to encrypt the data and a different key (private key) is used at the point of return terminal for decrypting the data. The private key could be generated in software and the decryption algorithm could be performed in software. In that case, the entire system resides in the processing unit 520 and its operating memory. (It should be apparent that the processor 520 could comprise more than one actual processor in order to achieve required speed or functionality.) The instructions for the key generation and the decryption algorithm may be read into main memory 575 from another computer-readable medium, such as other memory 580. Execution of the sequences of instructions contained in main memory 575 causes the processing unit 520 to perform the process steps described herein.

Alternatively, the key generation and the decryption algorithm could reside totally or partially in dedicated hardware. If the decryption algorithm resides in dedicated hardware, the system to enable image retrieval 510 and interface 515 between the processor 520 and the system to enable image retrieval 510 could include the dedicated hardware. In another configuration, the dedicated hardware could be considered as a component of the processor 520. Thus, embodiments of the invention are not limited to any specific combination of hardware circuitry and software.

In other possible embodiments of the system to enable image retrieval, if the image data has been compressed using a unique compression algorithm where the details of the algorithm are not known to the camera user, the decompression algorithm must be supplied to the processor. In one configuration, the entire system resides in the processing unit 520 and its operating memory. The instructions decoding algorithm may be read into main memory 575 from another computer-readable medium, such as other memory 580.

In still other possible embodiments, if the image data has been stored using a unique format where the details of the format are not known to the known to the camera user, instructions on format conversion from the proprietary format to a standard format (for example, JPEG, or TIFF) must be provided.

The term "computer-readable medium" as used herein refers to any medium that participates in providing instructions to the processor 520 for execution. Such a medium may take many forms, including but not limited to, non-volatile media and volatile media. Non-volatile media includes, for example, optical or magnetic disks, as one component of the memory 580. Volatile media includes dynamic memory, such as main memory 575.

Thus, embodiments have been disclosed of a system for providing a customer retrieved selected stored images, the images being stored in a single use digital camera wherein the digital camera provides no means for the customer to retrieve the stored images where the system comprises: means for retrieving the selected images in digital form, and, means for rendering the selected images in a form which can be provided to the customer. Embodiments have also been disclosed of a method of enabling the use of a single use digital camera for acquiring and storing images and thereafter providing the customer means for retrieving selected images from the stored images upon the customer returning the digital camera to a selected location.

Other embodiments of the invention, including combinations, additions, variations and other modifications of the disclosed embodiments will be obvious to those skilled in the art and are within the scope of the following claims.

What is claimed is:

1. A method of enabling the use of a single use digital camera for acquiring and storing images and thereafter providing a customer means for retrieving selected images from said stored images upon the customer returning the digital camera to a selected location, said method comprising the steps of:
   providing the customer said single use digital camera of the type that electronically records and stores said images selected by the customer, and provides no means for the customer to retrieve said stored images from said digital camera;
   wherein said digital camera includes a means for said customer to view said images that said customer acquires and stores and for selecting a predetermined number of said stored images for continued storage while removing the remainder of said stored images from storage within said digital camera; and,
   wherein said selected images cannot be removed from storage by said customer after being selected for continued storage; and,
   accepting return of said digital camera from said customer after said customer has utilized said digital camera to acquire and store said images and, thereafter, retrieving selected images for said customer.

2. The method of claim 1 wherein said selected images are retrieved for said customer in hardcopy form.

3. The method of claim 2 wherein said retrieving of said images in hardcopy form occurs at the selected location at which said camera was returned.

4. The method of claim 2 wherein said retrieving of said images in hardcopy form occurs at a remote photo-finishing node of a network.

5. The method of claim 4 wherein said network is the Internet.

6. The method of claim 1 wherein said selected images are retrieved for said customer in electronic form.

7. The method of claim 6 further comprising the step of transmitting said retrieved images to a remote node of a network.

8. The method of claim 7 further comprising the step of sharing said retrieved images via said network with at least one of a plurality of other entities located at other remote nodes of said network.

9. The method of claim 8 further comprising the step of providing said retrieved images in hardcopy form.

10. The method of claim 9 wherein the step of providing said retrieved images in hardcopy form occurs at the selected location at which said camera was returned.

11. The method of claim 9 wherein the step of providing said retrieved images in hardcopy form occurs at a remote photo-finishing node of said network.

12. The method of claim 7 wherein said network is the Internet.

13. The method of claim 1 further comprising the steps of:
   removing all recorded images from said digital camera after it has been utilized by said customer to acquire and record images and returned for retrieval of said selected images;

preparing said digital camera for re-use, and thereafter, providing either said customer or another customer with said digital camera.

14. The method of claim 1 wherein said step of providing a camera to a customer further comprises the step of accepting a payment from said customer.

15. The method of claim 14 wherein said payment includes a refundable portion.

16. A system for providing a customer retrieved selected stored images, said images being acquired and stored in a single use digital camera, said digital camera including means for said customer to view said images that said customer acquires and stores and for selecting a predetermined number of said stored images for continued storage while removing the remainder of said stored images from storage within said digital camera; and wherein said selected images cannot be removed from storage by said customer after being selected for continued storage wherein said digital camera provides no means for said customer to retrieve said stored images, said digital camera being returned by said customer to a selected location, said system comprising:
   means for retrieving said selected images in digital form from said digital camera, said means for retrieving not being available to said customer; and,
   means for rendering said selected images in a form which can be provided to a customer.

17. The system of claim 16 wherein said rendering means provide said selected images to said customer in hardcopy form.

18. The system of claim 17 wherein said rendering means provide said selected images in hardcopy form at the selected location at which said camera was returned.

19. The system of claim 17 wherein said rendering means provide said selected images in hardcopy form at a remote photo-finishing node of a network.

20. The system of claim 19 wherein said network is the Internet.

21. The system of claim 16 wherein said rendering means provide said selected images to said customer in electronic form.

22. The system of claim 21 further comprising means for transmitting said retrieved selected images to a remote node of a network.

23. The system of claim 22 further comprising means for sharing said retrieved selected images via said network with at least one of a plurality of other entities located at other remote nodes of said network.

24. The system of claim 22 wherein said network is the Internet.

25. The system of claim 16 further comprising:
   means for removing all recorded images from said digital camera after it has been utilized by said customer to acquire and record images and returned for retrieval of said selected images, and,
   means for preparing said camera for use in recording other images.

\* \* \* \* \*